Dec. 11, 1923.

1,477,199

N. L. WEARE

SAFETY PIN

Filed June 27, 1921

INVENTOR:
Neal L. Weare.
BY:
Erwin, Wheeler & Woolard
ATTORNEYS.

WITNESS:

Patented Dec. 11, 1923.

1,477,199

UNITED STATES PATENT OFFICE.

NEAL L. WEARE, OF MILWAUKEE, WISCONSIN.

SAFETY PIN.

Application filed June 27, 1921. Serial No. 480,620.

*To all whom it may concern:*

Be it known that I, NEAL L. WEARE, a citizen of the United States, and a resident of the city of Milwaukee, county of Milwaukee, and State of Wisconsin, have invented a certain new and useful Improvement in Safety Pins; and I do declare the following to be a clear, exact, and complete description thereof, such as will enable others skilled in the art of manufacturing similar articles to make the same.

My invention relates to an improved form of safety pin, which is provided with a guard or a locking device, whereby the point of the pin may be effectively retained in position, without liability to accidental displacement. The present safety pin is particularly applicable to use in connection with the nurture of small children, in that its construction is such that the pin cannot be released from its holding socket without an understanding of the said construction and the operations which are necessarily performed in loosening the pin. In the use of the pin under the conditions stated, its construction and method of operation are not understood by the infants to whose apparel the pin is applied, and consequently the liability to accidental unfastening of the pin is eliminated. At the same time the danger of injury due to the pin becoming unfastened either accidentally or by fumbling, is entirely obviated.

The safety pin comprising my invention is of simple construction and is easily produced by the operation of an automatic machine, the latter being equipped with suitable pointers, dies and tools for treating the wire and strips of metal which afford the elements for incorporation into the completed pin. The improved safety pin is therefore economically constructed, and its superiority over the forms of safety pins now in common use resides in the means with which it is provided for locking the pin point against accidental displacement.

The novel features of the invention will be pointed out in the appended claims.

In the drawings which accompany this specification,

Figure 1:
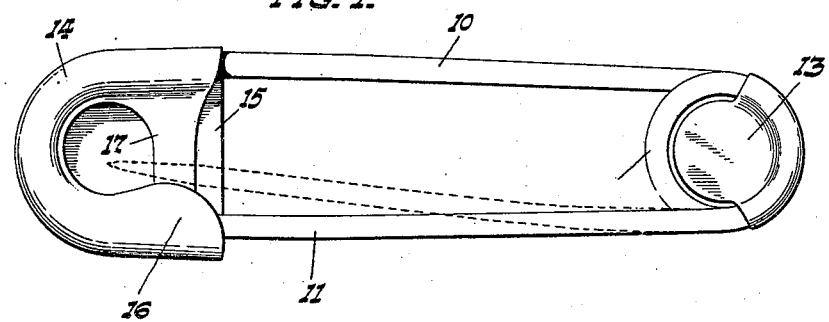
Figure 1 is an enlarged view in elevation of a safety pin constructed in accordance with my invention.
Figure 2:
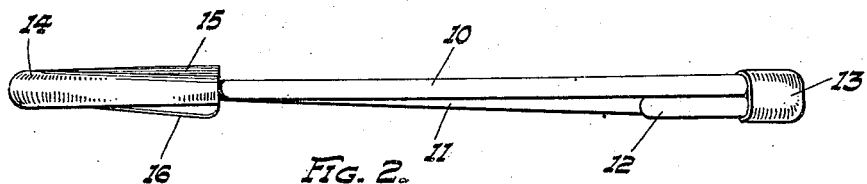
Fig. 2 is a plan view of the pin shown in Fig. 1.

Referring now to the drawings, the numeral 10 indicates the shank or principal element of a safety pin, formed from a length of spring wire, and pointed at 11 as usual. Viewing Fig. 1, the right hand end of the pin is given a double bend, as at 12, so as to provide the desired degree of resiliency. The said end may be protected by a metal cap 13, swaged thereon as is customary in devices of this class.

Referring to Fig. 1, it will be seen that the left hand end of the pin is provided with a cap 14, which embraces the bent end of the shank, being swaged thereabout so as to be firmly held in place as usual in similar constructions. The cap 14 is closed at one side, in the present instance at the rear side, by an integrally formed apron 15, which extends downwardly from the shank 10, and upturned as at 16, so as to provide a socket into which the point 11 of the pin, may be snapped, in the usual and well known manner.

Figure 4:
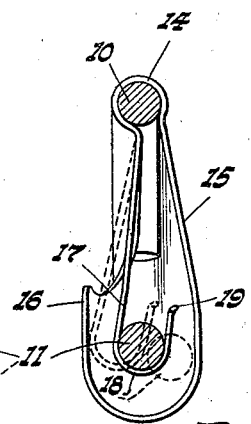
Fig. 4 is a sectional view of the line 4—4, Fig. 3, looking in the direction of the arrow and showing the manner in which the desired locking of the point of the pin is attained.

In forming the cap 14 from a strip of metal, a leg 17 of sufficient length to enable it to fulfill its purposes, is made to project therefrom. The leg extends downwardly from the cap at the front side thereof, and into the socket 16 formed from the apron. The lower part of the leg is bent as at 18 so as to form a hook or notch within which the point 11 of the pin may rest. The resiliency possessed by the metal of which the leg 17 is formed causes it to maintain the position shown in Fig. 4 with relation to the socket 16. The hook will normally be maintained in position centrally between the side walls of the socket 16, as is shown in Fig. 4, but may be pushed from side to side to admit the passage of the point of the pin around the hook. At such times, the leg will be slightly flexed in one direction or the other, so as to admit the easy movement of the point of the pin around the hook, without obstruction. The dotted line position of the leg and hook in Fig. 4 indicates how the movement described may occur.

Figure 3:
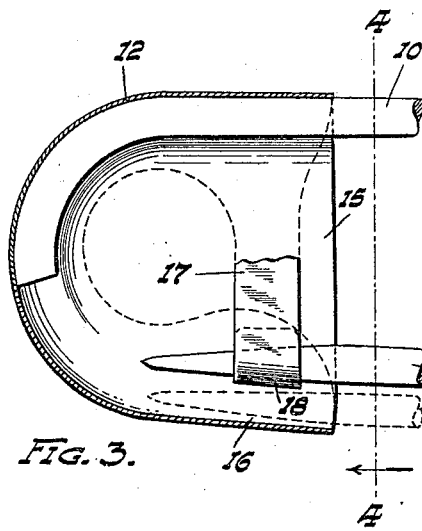
Fig. 3 is an enlarged view of the socket end of the pin, partly in section, and showing in combined full and broken lines the outlines of the locking arrangement provided for the point of the pin.

In operaton, the point of the pin will be inserted in the opening at the left hand side of the socket as usual and will spring into position at the bottom of the socket as indicated in dotted lines in Fig. 3, at which time it rests beneath the hook. Pressure applied to the pointed end of the pin will crowd the said pin past the barb 19 of the hook, which will then spring back into its normal position, and the point of the pin will be guided over the barb and allowed to rest upon and within the hook. The normal clearance of the barb 19 of the hook from the apron 15 of the cap will be sufficient to enable the entrance therein of the point of the pin, when the latter has been lifted from its seat within the hook, and it is desired to unfasten and remove the pin. In such movement the point of the pin follows the reverse path out of the socket 16.

From the foregoing, it will be apparent that the pin cannot become accidentally unfastened or loosened by very young children fumbling therewith. It cannot be unfastened without a mental concept of the mode of its operation. Hence the liability to suffering by infants attendant upon the use of safety pins of unguarded type is entirely eliminated.

Having thus described my invention, what I claim and desire to secure by Letters Patent of the United States is:

1. The improved safety pin comprising a shank and a pin connected at one end, a cap attached to the other end of the shank and provided with a socket for the entry of the point of the pin, a guard for preventing accidental displacement of the pin, such guard comprising a leg depending from the cap and formed as a hook which lies within the said socket, and normally held from engagement with the walls thereof.

2. The improved safety pin comprising a shank and a pin connected at one end, a cap attached to the other end of the shank and provided with a socket open at one side for the reception of the point of the pin, a guard for retaining the pin, the said guard formed as a depending leg from the said cap and having on the lower end thereof a hook reversely formed with relation to the socket, whereby accidental displacement of the pin is prevented.

In testimony whereof I have signed my name at Milwaukee, this 18th day of June, 1921.

NEAL L. WEARE.

Witnesses:
W. F. WOOLARD,
GLADYS M. McGHEE.